Dec. 10, 1935.  A. WOLLENSAK  2,024,018
FIELD GLASSES
Filed Dec. 11, 1933
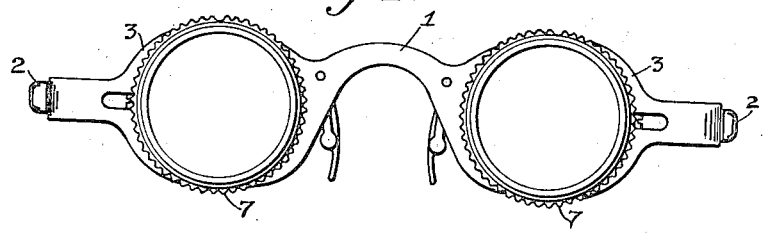
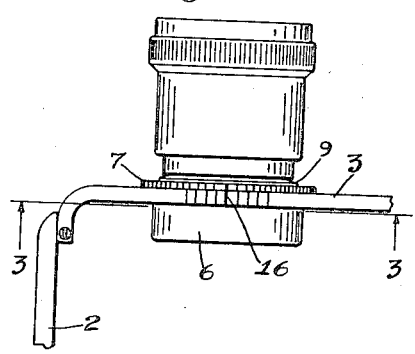
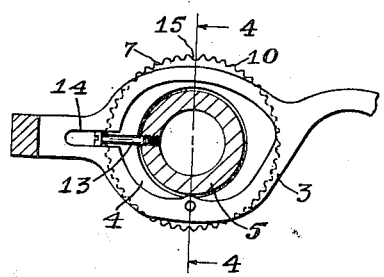
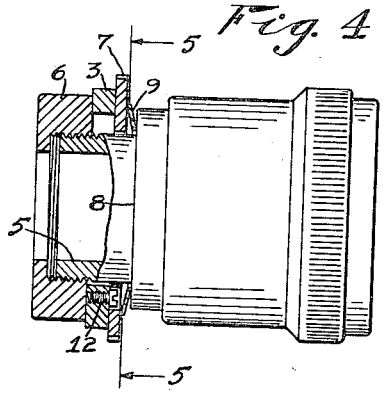
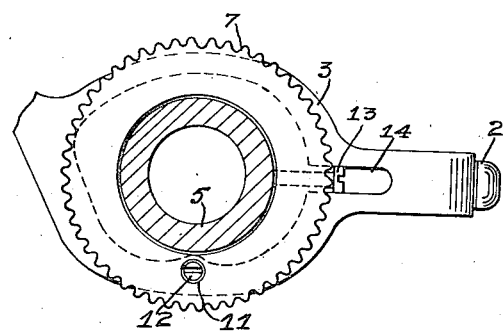
INVENTOR
Andrew Wollensak
BY Harold E. Stonebraker
ATTORNEY Patented Dec. 10, 1935

2,024,018

UNITED STATES PATENT OFFICE 2,024,018

FIELD GLASSES

Andrew Wollensak, Rochester, N. Y., assignor to Wollensak Optical Company, Rochester, N. Y., a corporation of New York Application December 11, 1933, Serial No. 701,832

8 Claims. (Cl. 88—41)

This invention relates to improvements in field glasses, and has for its purpose to provide a simple and practical structure permitting movement of the lens mounts towards and from each other, or endwise of a supporting frame, in order to make any desired pupillary adjustment.

More particularly, the invention is intended to afford an efficient construction that enables quickly securing a lens mount on its supporting frame and retaining it in such a manner that it can be readily shifted endwise of the frame, and is held frictionally in such adjusted position.

A further object of the invention is to provide a construction having few parts, which can be economically manufactured, and will efficiently bring about the intended results.

To these and other ends, the invention consists in the construction and arrangement of parts that will appear from the following description when read in conjunction with the accompanying drawing, the novel features being pointed out in the claims following the specification.

In the drawing:

Fig. 1 is a front elevation of a pair of field glasses embodying a preferred embodiment of the invention;

Fig. 2 is a partial plan view;

Fig. 3 is a sectional view on line 3—3 of Fig. 2;

Fig. 4 is a sectional view on line 4—4 of Fig. 3, and

Fig. 5 is a sectional view on line 5—5 of Fig. 4.

Referring more particularly to the drawing in which like reference numerals refer to the same parts throughout the several views, the structure shown, which is illustrative of a preferred embodiment of the invention, includes a supporting frame comprising a bridge 1, temples 2, and lens mount supporting portions 3, each of which is provided with an opening 4 larger than the diameter of the lens barrel so as to permit lateral adjustment of the latter longitudinally of the supporting frame.

Each lens mount preferably includes a barrel 5 which extends through the opening 4 in the supporting frame and is held engaged with the frame by an end ring 6 threaded on the end of the barrel and engaging the supporting frame on one side. The other side of the frame is engaged by a disk 7 which is seated against a shoulder 8 on the barrel, while 9 is a spring friction ring interposed between the disk 7 and shoulder 8, see Fig. 4, so as to maintain the parts frictionally engaged when the ring 6 is tightened and permit sliding movement of said parts on the frame when the lens mount is adjusted endwise of the supporting frame.

In order to effect such adjustment, the disk 7, which has a knurled periphery 10 extending above and below the supporting frame to enable engaging and manipulating it, is provided with an opening 11 that engages over the head of a pin 12 that is fixedly mounted on the supporting frame 3. The opening 11 in the disk 7 is sufficiently larger than the head of pin 12 so as to allow a slight play between the disk and the pin 12, permitting the necessary vertical movement of the disk as the barrel is adjusted laterally. Thus the disk 7 can be swung about the axis or pin 12, and when swung in this fashion, the disk 7 carries with it the barrel 5 or lens mount which is thus adjustable toward or from the other lens mount, longitudinally of the frame.

In order to guide the lens mount and prevent rotation about its own axis, the barrel 5 is provided with guiding means in the form of a pin 13 fixed in one side of the barrel in a slot 14 which extends endwise of the supporting frame so that as the operating disk 7 is swung about the pivot 12, the pin 13 travels in one direction or the other in the slot 14 to guide the lens mount and prevent its rotation.

The disk 7 may be provided with a center notch 15 for cooperation with a scale 16 on the upper edge of the supporting frame to indicate the extent of adjustment, which is obtained by grasping the top and bottom knurled surfaces of the disk 7 and forcing the upper surface to the right or left, causing the disk to swing about the pivot 12 and to carry the lens mount to the right or left longitudinally of the supporting frame. The friction of spring ring 9 is such as to permit the necessary movement of the lens mount on the frame while holding it securely in any adjusted position.

While the invention has been described with reference to certain details of construction, it is not restricted to the precise form herein disclosed, and this application is intended to cover such other embodiments or modifications as may come within the purposes of the improvement or the scope of the following claims.

I claim:

1. Mechanism for permitting pupillary adjustment of the lens mounts of field glasses, comprising a supporting frame having an opening therein, a lens mount including a barrel extending through said opening, a shoulder on the barrel, a disk mounted on the barrel and engaging one side of the supporting frame, a spring friction ring interposed between said shoulder and said disk, retaining means on the barrel engaging the other side of the supporting frame, a pivotal connection between said disk and supporting frame, the supporting frame having a slot extending endwise thereof, and a guiding member carried by the barrel and engaging said slot.

2. Mechanism for permitting pupillary adjustment of the lens mounts of field glasses, comprising a supporting frame having an opening therein, a lens mount including a barrel extending through said opening, a shoulder on the barrel, a disk mounted on the barrel and engaging one side of the supporting frame, a spring friction ring interposed between said shoulder and said disk, retaining means on the barrel engaging the other side of the supporting frame, the supporting frame having a pivot thereon and said disk having an opening engageable with said pivot, the supporting frame being provided with a slot extending endwise thereof, and a guiding member carried by the barrel and engageable in said slot.

3. Mechanism for permitting pupillary adjustment of the lens mounts of field glasses, comprising a supporting frame having an opening therein, a lens mount including a barrel extending through said opening, a shoulder on the barrel, a disk mounted on the barrel and having portions extending above and below the supporting frame to permit engagement and manipulation of the disk, the disk having frictional engagement with one side of the supporting frame, a spring friction ring interposed between said disk and said shoulder on the barrel, a ring threaded on the inner end of the barrel and engaging the opposite side of the supporting frame, a pivot on the supporting frame, said disk having an opening engaging said pivot to permit swinging movement of the disk, the supporting frame having a slot extending endwise thereof, and a guiding member carried by the barrel and movable in said slot.

4. Mechanism for permitting pupillary adjustment of the lens mounts of field glasses, comprising a supporting frame having an opening of greater length than height to permit endwise adjustment of the lens mount, a lens mount including a barrel extending through said opening and adjustable longitudinally thereof, retaining means on the barrel engaging one side of the supporting frame, a shoulder on the barrel on the other side of the supporting frame, a spring friction member surrounding the barrel for maintaining frictional yieldable engagement between the barrel and supporting frame, and means rotatably mounted on the barrel and pivotally connected to the frame for effecting adjustment of the barrel endwise of the frame.

5. Mechanism for permitting pupillary adjustment of the lens mounts of field glasses, comprising a supporting frame having an opening of greater length than height to permit endwise adjustment of the lens mount, a lens mount including a barrel extending through said opening and adjustable longitudinally thereof, a disk rotatably mounted on the barrel and yieldably engaging one side of the supporting frame, retaining means on the barrel engaging the opposite side of the frame, and a pivotal connection between said disk and the supporting frame for effecting movement of the barrel endwise of the frame when the disk is rocked on the frame.

6. Mechanism for permitting pupillary adjustment of the lens mounts of field glasses, comprising a supporting frame having an opening of greater length than height to permit endwise adjustment of the lens mount, a lens mount including a barrel extending through said opening and adjustable longitudinally thereof, a shoulder on the barrel, a disk rotatably mounted on the barrel and engaging one side of the supporting frame, a spring friction ring surrounding the barrel and interposed between said shoulder and disk, retaining means on the barrel engaging the other side of the supporting frame, and a pivotal connection between said disk and supporting frame for effecting movement of the barrel endwise of the frame when the disk is rocked about said pivot on the frame.

7. Mechanism for permitting pupillary adjustment of the lense mounts of field glasses, comprising a supporting frame having an opening of greater length than height to permit lateral adjustment of the lens mount, a lens mount including a barrel extending through said opening, said lens mount being adjustable laterally in said opening, a shoulder on the barrel on one side of the supporting frame, retaining means on the barrel engaging the other side of the supporting frame, a spring friction ring surrounding the barrel for effecting yieldable and frictional engagement between the barrel and frame, the supporting frame having a slot extending endwise thereof intermediate its top and bottom, and a guiding member extending laterally from the barrel and engaging said slot.

8. Mechanism for permitting pupillary adjustment of the lens mounts of field glasses, comprising a supporting frame having an opening therein, a lens mount including a barrel extending through said opening, a shoulder on the barrel on one side of the supporting frame, retaining means on the barrel engaging the other side of the supporting frame, a spring friction ring surrounding the barrel for effecting yieldable and frictional engagement between the barrel and frame, the supporting frame having a slot extending endwise thereof intermediate its top and bottom, a guiding member extending laterally from the barrel and engaging said slot, and means rotatably mounted on the barrel and pivotally connected to the supporting frame for effecting adjustment of the barrel endwise of the frame.

ANDREW WOLLENSAK.